United States Patent Office 3,544,641
Patented Dec. 1, 1970

3,544,641
PROCESS FOR THE PRODUCTION OF SOLID MULTIBROMOALKANE OR CYCLOALKANE ADDITION PRODUCTS
John Versnel, Plainsboro, N.J., assignor to Cities Service Company, New York, N.Y., a corporation of Delaware
No Drawing. Filed Dec. 28, 1967, Ser. No. 694,087
Int. Cl. C07c 23/02, 21/00
U.S. Cl. 260—648                                    10 Claims

ABSTRACT OF THE DISCLOSURE

Processes are described for the reaction of multiunsaturated aliphatic or cycloaliphatic hydrocarbons with elemental bromine to produce solid multibromoalkane or cycloalkane addition products which are useful as flame retardants in thermoplastic organic polymers. Unreacted bromine in the reaction mixture is deactivated by reaction with an alkali metal bisulfite and, by carefully controlling the relative quantities of water and solvent present during this deactivation step, high purity products are obtained.

BACKGROUND OF THE INVENTION

Field of the invention

This invention relates to an improved process for the production of high purity multibromoalkane or cycloalkane addition products by the reaction of bromine with a multiunsaturated aliphatic or cycloaliphatic hydrocarbon. More specifically, this invention relates to the alkali metal bisulfite deactivation of unreacted bromine in such reaction mixture in the presence of a critical ratio of water to solvent.

Description of the prior art

The addition of bromine to the ethylenic double bonds of multiunsaturated hydrocarbons is well known. These reactions typically are conducted in a liquid alkanol or saturated hydrocarbon solvent, the insoluble multibrominated products being separated by filtering or centrifuging the reaction mixture. Since the unsaturated hydrocarbon reactant is known to exercise a solubilizing effect on the desired bromohydrocarbon product, it is customary to employ an excess of bromine, which is deactivated at the completion of the reaction by the addition of a large volume of aqueous alkali metal bisulfite. The insoluble products are generally separated as a dark colored sticky mixture of liquids and solids, from which the white crystalline multibromohydrocarbon can be recovered only with great difficulty by repeated solvent extraction and recrystallization operations. While it has been possible in laboratory experiments to avoid the formation of these dark colored liquid contaminants by conducting the reaction in the substantial absence of reactive hydroxyl compounds e.g., compounds such as water or alcohol, this is generally not practicable in commercial operations and substantial quantities of the desired product are, therefore, lost in the purification procedures.

SUMMARY

The instant invention is a method of minimizing the contamination of the solid multibromoalkane or cycloalkane addition product recovered from a reaction mixture containing said product and unreacted bromine which is produced by reacting a multiunsaturated aliphatic or cycloaliphatic hydrocarbon with bromine in the presence of a reactive hydroxyl compound. This is accomplished by deactivating the unreacted bromine in such reaction mixture by reacting it with an alkali metal bisulfite in the presence of a solvent selected from the group consisting of liquid alkanols, cycloalkanols, alkanes and cycloalkanes and a critical quantity of from about 0.1% to about 8% by weight of free water based on the total free water and solvent. Under such conditions, the dark colored oily contaminants remain in solution in the solvent and the insoluble multibromoalkane or cycloalkane addition product can be separated by conventional means as a white crystalline high purity material. Unusually high purity product can be obtained when the free water present during the bromine deactivation step is from about 0.2% to about 5% by weight of the solution or mixture of free water and solvent. The practice of the process of this invention enables one to eliminate the tedious product purfication procedures which heretofore have been necessary when the bromination reaction was conducted in the presence of an alcohol solvent or the small quantities of water which are normally present in commercial solvents and reactants.

DESCRIPTION OF THE PREFERRED EMBODIMENTS

The improved bromine deactivation process of this invention can be applied to any bromination reaction mixture containing a multibromoalkane or cycloalkane addition product and unreacted bromine which is produced by reacting a multiunsaturated aliphatic or cycloaliphatic hydrocarbon with bromine, and is particularly beneficial when such bromination relaticon has been conducted in the presence of a reactive hydroxyl compound. Essentially, this improved process involves careful controlling of the relative quantities of free water (i.e., unrecated water) and liquid alcohol or saturated hydrocarbon solvent that are present in the reaction mixture during the deactivation of unreacted bromine with added alkali metal bisulfite, and then separating the insoluble solid bromoalkane or cycloalkane product. As previously indicated, the quantity of free water present during the reaction of the bromine and alkali metal bisulfite must be from about 0.1% to about 8% by weight of the total free water and solvent, and preferably is from about 0.2% to about 5%.

The alkali metal bisulfite may be added as a substantially dry powder or as a solution or slurry in a liquid alkanol, cycloalkanol, alkane, cycloalkane or water; the selection of dry or wet alkali metal bisulfite addition being limited primarily by the necessity of maintaining the critical free water to solvent ratio in the reaction mixture during bromine deactivation. For example, when the bromination reaction mixture contains the proper proportions of free water and solvent, bromine deactivation is advantageously effected by adding the alkali metal bisulfite in substantially dry form. Such substantially dry addition is also advantageous when the free water content of the bromination reaction mixture is excessive, although, under such conditions, it is generally desirable to first add additional dry solvent so as to reduce this level to 8% or less of the total water and solvent. Conversely, when the free water or solvent content of the reaction mixture is inadequate, it is essential that additional water or solvent be added, preferably as a solution or slurry of the alkali metal bisulfite. Since it is often inconvenient to accurately measure the free water and solvent content of a bromination reaction mixture, it is a preferred embodiment of this invention to add the alkali metal bisulfite along with a mixture of water and solvent in the proper ratio. An especially preferred method of adding the alkali metal bisulfite is as a solution in a lower alkanol which contains from about 0.5% to about 5% by volume of water.

The bromine deactivation process of this invention is applicable to the reaction mixture of bromine and any multiunsaturated aliphatic or cycloaliphatic hydrocarbons having from about 4 to about 20 carbon atoms. Exemplary of such suitable hydrocarbons are 1,3-butadiene, isoprene, 1,4-hexadiene, 1,7-octadiene, 3-methyl-1,4,6-heptatriene, 1,4,9-decatriene, 1,3-cyclopentadiene, 1,3-cyclooctadiene, 1,5-cyclooctadiene, 1,3,5,7-cyclooctatetraene, 1,6-cyclodecadiene, 1,5,9-cyclododecatriene, trimethyl-1,5,9-cyclododecatriene and 1,5,9,13-cyclohexadecatetraene. The improved results obtained by operation in accordance with this invention are particularly notable when the multiunsaturated reactant is a cycloaliphatic hydrocarbon having from two to four ethylenic double bonds in an eight to sixteen member carbocyclic ring, and are outstanding in the case of eight to twelve member carbocyclic dienes and trienes, e.g., cyclooctadiene, cyclodecadiene or cyclododecatriene.

Among the solvents which are found to be useful in the bromine deactivation step of this invention, as well as in the bromination step, are the normally liquid alkanols, cycloalkanols, alkanes and cycloalkanes. Representative examples of such solvents are methanol, ethanol, 2-ethylhexanol, n-hexane, i-octane, cyclohexanol and cyclohexane. Because of the high solubility of the dark colored liquid bromination products in primary alkanols, these materials are preferred solvents for both the bromination and bromine deactivation steps. The quantity of solvent that is employed in either of these steps may be varied over a wide range, the optimum being the minimum quantity that will dissolve both the reactants and the dark colored liquid bromination products. This optimum is, of course, dependent on such variable factors as the nature of the unsaturated hydrocarbon reactant and the relative quantities of such solvent and water that are present in the system. Satisfactory results are generally obtainable in both the bromination and deactivation steps when the weight of solvent is at least about equal to that of the unsaturated hydrocarbon originally introduced into the bromination reaction. The use of larger quantities of solvent (e.g., 3 to 10 or more times the weight of such unsaturated hydrocarbon) in the deactivation step is preferred, particularly when large quantities of unreacted bromine are present.

Any alkali metal bisulfite may be employed in the bromine deactivation process of this invention. Because of the fact that it is readily available and has appreciable solubility in the preferred alkanol solvents, the use of sodium bisulfite is preferred. In order to insure the total deactivation of unreacted bromine, one should employ at least a stoichiometric equivalent quantity of alkali metal bisulfite. Since it is inconvenient to accurately measure the quantity of unreacted bromine in the reaction mixture and the value can be only roughly calculated, it is generally preferred to employ the bisulfite in substantial excess over the calculated theoretical requirement. When very large excesses are used, the multi-bromoalkane or cycloalkane product may contain small quantities of water soluble salts; however, these can easily be washed out of the separated product with water.

The bromine deactivation process of this invention, like the bromination step, is advantageously conducted at a temperature of from about 10° C. to about 50° C., preferably at about room temperature. Temperatures above 60° C. or below —10° C. can also be used; however, there is little advantage in operating outside the preferred temperature range.

The numerous advantages inherent in operation in accordance with this invention will be apparent to those skilled in the art from an examination of the following examples. Examples I, IV and VI represent typical prior art procedures, whereas the remaining examples are illustrative of the instant invention.

EXAMPLE I

A clean dry five liter flask equipped with a stirrer is charged with 1800 grams of 190 proof ethanol and 450 grams of pure 1,5-cyclooctadiene. Fourteen hundred grams of bromine containing 2 wt. percent water is then introduced at room temperature and at a uniform rate over a period of two hours. The reaction mixture is stirred for an additional five minutes and then poured into a solution of 150 grams of sodium bisulfite in two liters of water. This mixture is then agitated for five minutes and centrifuged to separate a dark brown sticky insoluble product. 50 grams of this insoluble product is dried at 110° C. for one hour, slurried with 100 milliliters of absolute ethanol and filtered. Analysis of the light brown residue shows it to be largely 1,2,5,6-tetrabromocyclooctane.

EXAMPLE IIa

A clean dry 5 liter flask equipped with a stirrer is charged with 1800 grams of 190 proof ethanol and 450 grams of pure 1,5-cyclooctadiene. Fourteen hundred grams of bromine containing 2 wt. percent water is then introduced at room temperature at a uniform rate over a period of two hours. The reaction mixture is stirred for an additional five minutes and then sampled. Analysis of the sample shows a free water content that is about 6 wt. percent of total free water and ethanol. One hundred and fifty grams of dry sodium bisulfite is then added to the reaction mixture, which is agitated for five minutes and centrifuged to remove insoluble materials. These insoluble materials are dried at 110° C. for one hour, yielding white crystalline high purity 1,2,5,6-tetrabromocyclooctane.

EXAMPLE IIb

The procedure of Example IIa is repeated, except that the sodium bisulfite is added as a mixture with 500 grams of 190 proof ethanol. The product is equivalent in purity and yield to that of Example IIa.

EXAMPLE III

The procedure of Example I is repeated employing 1,5,9-cyclododecatriene in place of cyclooctadiene. The dry insoluble product is white crystalline high purity 1,2,5,6,9,10-hexabromocyclododecane.

EXAMPLE IV

The procedure of Example I is repeated employing 1800 grams of n-hexane in place of 190 proof ethanol and 450 grams of 1,5,9-cyclododecatriene in place of cyclooctadiene. Workup of the insoluble product as in Example I yields a tan crystalline material that is largely 1,2,5,6,9,10-hexabromocyclododecane.

EXAMPLE V

The procedure of Example III is repeated employing 1800 grams of n-hexane in place of 190 proof ethanol. The dried insoluble product is white crystalline high purity 1,2,5,6,9,10-hexabromocyclododecane.

EXAMPLE VI

A clean dry five liter flask equipped with a stirrer is charged with 1800 grams of absolute ethanol and 450 grams of dry 1,5-cyclooctadiene. 1350 grams of dry bromine is then introduced at room temperature at a uniform rate over a period of two hours. The reaction mixture is stirred for an additional five minutes, and 150 grams of sodium bisulfite in two liters of water is added. The mixture is agitated for five minutes and centrifuged to separate a dark brown sticky insoluble product.

EXAMPLE VII

The procedure of Example VI is repeated except that the 150 gram portion of sodium bisulfite is added as a solution in 500 milliliters of 190 proof ethanol. The insoluble product is white crystalline 1,2,5,6-tetrabromocyclooctane.

I claim:
1. In a process for recovering a solid multibromoalkane or cycloalkane addition product from a reaction mixture containing said product and unreacted bromine which is produced by reacting a multiunsaturated ali- phatic or cycloaliphatic hydrocarbon with bromine in the presence of liquid alkanol, cycloalkanol or water, the improvement comprising deactivating said unreacted bromine with an alkali metal bisulfite in the presence of a solvent selected from the group consisting of liquid alkanols, cycloalkanols, alkanes, and cycloalkanes and from about 0.1% to about 8% by weight of free water based on said solvent and water, and separating said solid product.

2. The process of claim 1 wherein the quantity of free water present during the bromine deactivation is from about 0.2% to about 5% by weight of said solvent and water.

3. The process of claim 1 wherein the reaction of said multiunsaturated aliphatic or cycloaliphatic hydrocarbon is conducted in the presence of said solvent.

4. The process of claim 3 wherein said reaction mixture contains more than amount 0.1% by weight of free water based on said solvent and water and said alkali metal bisulfite is added in substantially anhydrous form.

5. The process of claim 3 wherein said alkali metal bisulfite is sodium bisulfite.

6. The process of claim 3 wherein said alkali metal bisulfite is added to said reaction mixture as a solution in a lower alkanol which contains up to about 5% by volume of water.

7. The process of claim 3 wherein the free water content of said reaction mixture is adjusted to from about 0.2% to about 5% by weight of said solvent and water prior to the addition of said alkali metal bisulfite.

8. The process of claim 3 wherein said solvent is a liquid alkanol.

9. In a process for recovering a solid multibromalkane or cycloalkane addition product from a reaction mixture containing said product and unreacted bromine which is produced by reacting a multiunsaturated aliphatic or cycloaliphatic hydrocarbon having from about eight to about twelve carbon atoms with bromine in the presence of a liquid alkanol solvent, the improvement comprising deactivating said unreacted bromine by adding to said reaction mixture a solution of sodium bisulfite in a liquid alkanol which contains from about 0.5% to about 5% by volume of water, and separating said solid product.

10. The process of claim 9 wherein said multi-unsaturated hydrocarbon is selected from the group consisting of cyclooctadiene and cyclododecatriene.

References Cited

FOREIGN PATENTS

| | | | |
|---|---|---|---|
| 1,147,574 | 4/1963 | Germany | 260—648 |
| 1,101,410 | 3/1961 | Germany | 260—648 |

DANIEL D. HORWITZ, Primary Examiner

U.S. Cl. X.R.

260—660